(No Model.)
A. W. JACKSON.
AIR BRAKE HOSE COUPLING.
No. 434,873. Patented Aug. 19, 1890.
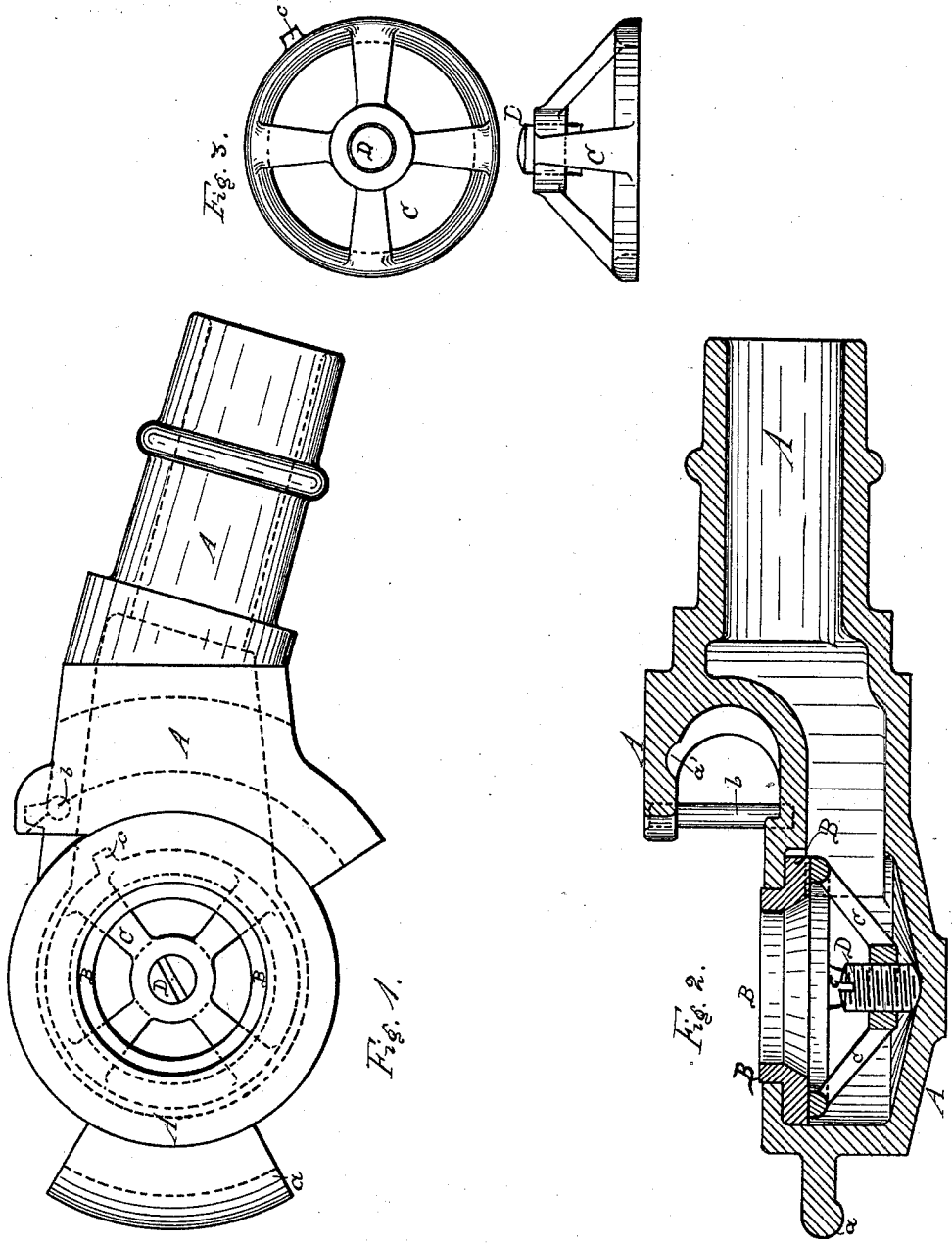

UNITED STATES PATENT OFFICE.

AMARIAH W. JACKSON, OF CHICAGO, ILLINOIS.

AIR-BRAKE HOSE-COUPLING.

SPECIFICATION forming part of Letters Patent No. 434,873, dated August 19, 1890.

Application filed January 13, 1890. Serial No. 336,837. (No model.)

*To all whom it may concern:*

Be it known that I, AMARIAH W. JACKSON, of the city of Chicago, county of Cook, State of Illinois, have invented a new and useful Improvement in Air-Brake Hose-Couplings, of which the following is a specification.

The invention relates to a class of appliances used in connection with the Westinghouse air-brake system, and is an improved means of attaching the rubber gasket used to make an air-tight joint in the coupling used on railway air-brakes.

Heretofore the gasket has been held in its place by a skeleton frame having an annular rim with arms radiating to a boss in the center, the shell of the coupling having been bored out to admit the skeleton frame on the back side. Then a plug is fitted into the shell with a screw. This plug has a recess bored into it to steady or admit the boss on the skeleton frame. The plug is then used to force the skeleton frame against the gasket, making an air-tight joint. This manner is objectionable, first, by reason of the labor required to make the coupling; second, it is necessary to have an extra coupling in each car, and, third, it must be taken to a shop to remove the gasket, it being the first thing to wear out.

The object of my invention is to provide a simple and easy device for making the coupling and quick easy way to remove the worn gasket and replace a new one by an unskilled person, thereby doing away with the necessity for carrying an extra coupling. All that will be required is an extra gasket and screw-driver to make repairs on the road.

The invention consists in making a gasket-compressor having an annular washer with four arms or braces extending at an angle toward the center, where it unites with a boss in the center, forming a cone. In this center a set-screw is fitted with a round point, with the head toward the rim or port in the shell. The coupling-shell is cast hollow by a dry sand core in one solid piece. In this core I bed the compressor in a finished state. When the shell has been cast, the compressor will be inside, loose, and ready for the gasket without any more fitting, and can be pressed against the under side of the gasket by turning the set-screw through the port in the shell, the inner side of the back of the shell being made slightly concaved, so that the point of the set-screw will adjust itself to its place.

In the accompanying drawings, in which similar letters of reference indicate like parts, Figure 1 is a view of the face side or port side of a coupling with the lock-lip cut away, showing the compressor inside by dotted lines. Fig. 2 is a vertical and longitudinal section of the same. Fig. 3 is a horizontal and vertical view embodying my invention.

A A A is the shell, Fig. 2, showing the gasket B B B projecting through the port and held in place by the compressor C C C, the set-screw D, resting in the center of shell A, being used to force the rim up against the gasket B, the head of the screw D being reached through the port in the coupling-shell.

The operation of this device is as follows: When it is required to remove or replace a gasket, a screw-driver or wrench is passed through the port to the set-screw, and then being turned the gasket will be released and can be withdrawn easily and another placed in and tightened to the required pressure, taking but a moment to do what has taken a half-hour to do heretofore.

What I claim is—

The combination, in air-brake hose-couplings, of the gasket-compressor C, having an annular rim with arms connected therewith converging to a hub at an angle, forming a cone, with a set-screw D fitted in said hub, with its head on the concaved side, its point resting against the inner back of the shell A, and the rim pressing the gasket B up against the under side of the port, substantially as described.

AMARIAH W. JACKSON.

Witnesses:
 THOS. GREGG,
 C. C. BISHOP.